United States Patent [19]

Walsh

[11] 3,967,148

[45] June 29, 1976

[54] BRUSH HOLDER ASSEMBLY

[75] Inventor: Richard S. Walsh, Foxboro, Miss.

[73] Assignee: Ark-Les Switch Corporation, Watertown, Mass.

[22] Filed: Jan. 30, 1975

[21] Appl. No.: 545,760

[52] U.S. Cl. .......................................... 310/239
[51] Int. Cl.$^2$ .......................................... H02K 13/00
[58] Field of Search ........... 310/239, 240, 242, 241, 310/245, 246, 247, 219; 339/5, 5 P, 6, 8

[56] References Cited

UNITED STATES PATENTS

| | | | |
|---|---|---|---|
| 1,239,056 | 9/1917 | Sparks | 310/247 |
| 1,265,873 | 5/1918 | Berg | 310/247 |
| 1,469,720 | 10/1923 | Dorsey | 310/239 |
| 2,099,554 | 11/1937 | Bean | 310/241 |
| 2,275,613 | 3/1942 | Cullin | 310/239 |
| 2,584,214 | 2/1952 | Luther | 310/247 |
| 3,176,177 | 3/1965 | Huston | 310/247 |
| 3,177,388 | 4/1965 | Cook | 310/247 |
| 3,182,218 | 5/1965 | Videtic | 310/247 |
| 3,617,786 | 11/1971 | Stielper | 310/247 |

*Primary Examiner*—R. Skudy

[57] ABSTRACT

Brush holder assembly for use in electric motors comprising a base and wall means defining an elongated brush supporting and guiding channel having a pair of longitudinal opposed slots in opposite walls thereof, a plate member having wire connecting means and retaining means for holding it in position, and a brush-biasing spring stop surface. A plurality of holders may be mounted on a single plate which forms the base of the channels, and the plate member may be provided with a male terminal tab for receiving the female terminal of a drive current wire.

11 Claims, 6 Drawing Figures

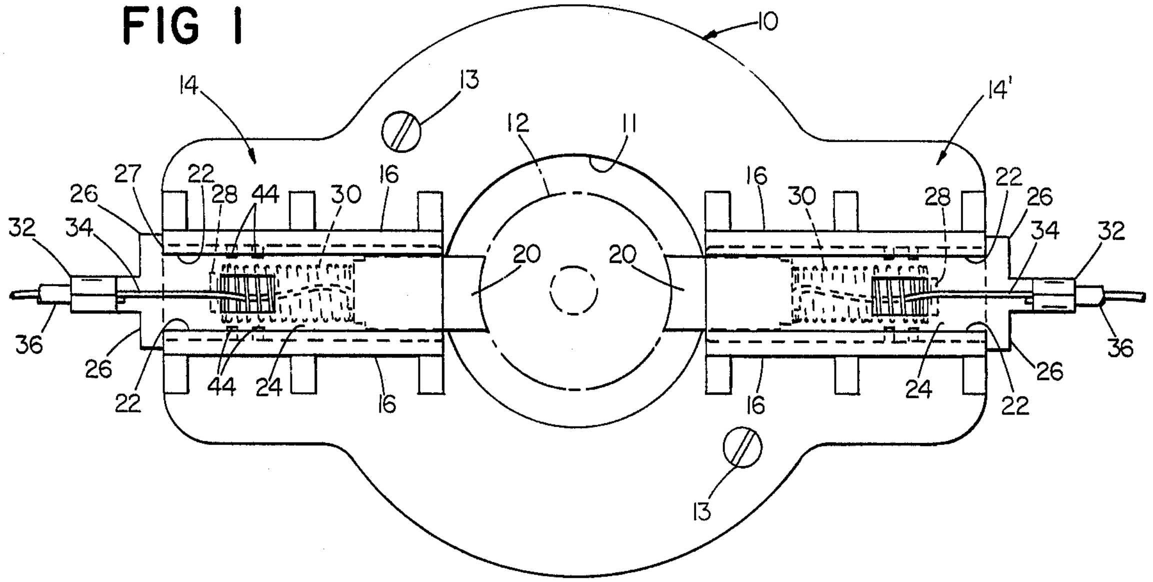
FIG 1
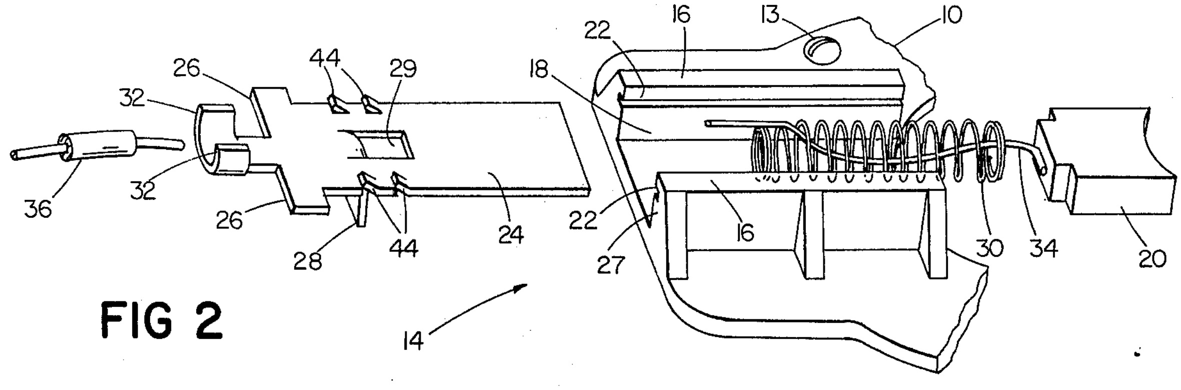
FIG 2
FIG 3
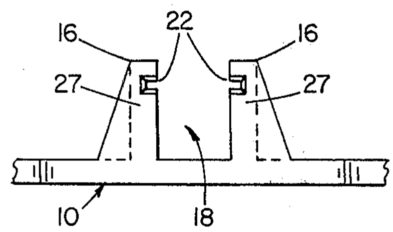
FIG 4
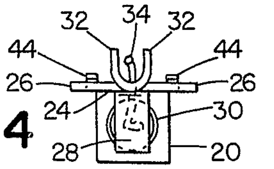
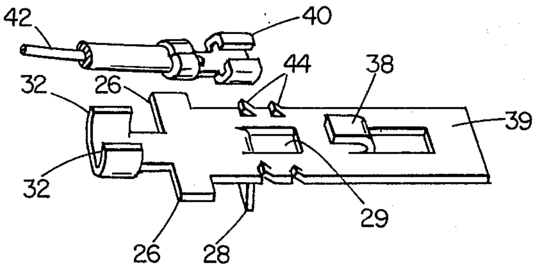
FIG 5
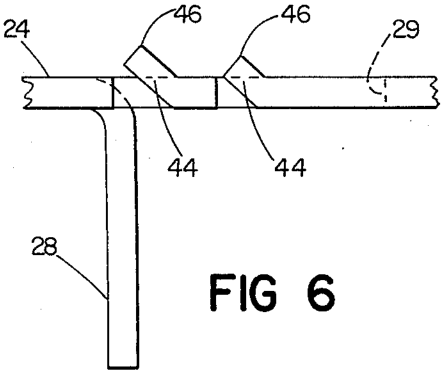
FIG 6

BRUSH HOLDER ASSEMBLY

BACKGROUND OF THE INVENTION

This invention relates to a low cost brush assembly for electric motors. More particularly, it relates to such an electric brush assembly which has the multiple advantages of ease and economy of fabrication, assembly and installation in a motor housing.

As is well known, armature wound motors having segmented commutators must have conducting brushes for providing electrical connection to the armature windings. These brushes are ordinarily of solid graphite material which is spring pressed into conductive engagement with a cylindrical commutator, or slip ring. Provision must be made for containing these brushes in the motor housing generally radially disposed to the segmented commutator or slip rings. Provision must also be made for an external conducting link from the brushes to power terminals, or to the rest of the motor circuit. Ordinarily the brushes are contained in a separate motor brush assembly which, when inserted into the motor housing, serves the following purposes: it aligns the brush with the commutator; it provides a spring bias to hold the brush in conductive engagement against the commutator; it provides a continuous circuit connection to the brush; it provides a terminal for the connection of the brush into the motor circuit; and it insulates the brush from the motor housing and other motor parts. In the prior art, these motor brush assemblies have often taken complex forms having many separate parts which had to be assembled, including screws, machine bored pieces, and other parts requiring costly close tolerance machining. Often the metallic brush holders have required complex metal forming techniques. Consequently, the prior art motor brush assemblies have entailed high costs of fabrication, assembly and installation.

SUMMARY OF THE INVENTION

Accordingly, it is a principal object of this invention to provide a very low cost motor brush assembly. A further object is to provide a motor brush holder of the above character which may be easily and inexpensively assembled and may be mass produced from readily available inexpensive materials without the necessity of close dimensional tolerances. Still other objects of the invention are to provide a motor brush assembly wherein all the brush holders are mounted on a single assembly, several different sizes of drive current wires may be used or changed as required, and electrical connections need no soldering.

In general, the invention features a motor brush holder for use with an electric motor having a commutator or the like, comprising a brush supporting and guiding element for supporting and guiding a motor brush for radial movement relative to the commutator. The element comprises a base and wall means which together define a brush supporting and guiding channel having opposed slots in opposite walls. A brush stop surface is disposed within the channel; a metal plate member is mounted in the slots, extending therebetween, and has integral wire connection means and retaining means for securing itself in the slots. In preferred embodiments, a plurality of brush supporting and guiding sites are mounted on an integrally molded insulating plastic plate; each site comprises a base for attachment to the motor defined by the plate and a pair of spaced integral upstanding wall means which, together with the base, define the channel; a motor brush is mounted in the channel in electrical contact with the plate member; brush biasing spring means is interposed between the stop surface and the end of the brush; a brush connecting wire extends from the brush to the wire connector means; the brush stop surface comprises a flange extending from the plate member into the channel; the retaining means for securing the plate member in the slots comprises resilient burrs extending out of the plane of the plate member outwardly from the channel backwardly from the commutator; the wire connecting means comprises crimp tabs; the metal plate member has an integral male terminal tab; the spring means is a coil spring, and; the brush connecting wire extends through the coil.

Other advantages and features of the invention will be apparent from the description and drawings herein of a preferred embodiment thereof.

BRIEF DESCRIPTION OF THE DRAWINGS

FIG. 1 is a plan view of an embodiment of the invention with the commutator of an electric motor in phantom;

FIG. 2 is a perspective exploded view of a brush holder site of FIG. 1;

FIG. 3 is an end view of the channel of FIG. 2;

FIG. 4 is an end view of the plate member of FIG. 2;

FIG. 5 is a perspective view of a second embodiment of a plate member constructed in accordance with the invention;

FIG. 6 is a magnified detail of a section of the plate member of FIG. 2 or FIG. 6 showing its burrs.

DESCRIPTION OF THE PREFERRED EMBODIMENT

Referring to FIG. 1, the motor brush assembly of the present invention comprises a generally circular plate 10, mounted in a motor housing such as by bolts 13, which forms the base for two brush holding sites 14, 14′, and has a central opening 11 in which a commutator 12 of a conventional electric motor is positioned. At each holding site, a pair of side walls 16, together with plate 10, form a three-sided channel 18 sized to fit well-known brushes 20. Each side wall 16 has an interior slot 22, extending along its whole length and spaced above plate 10 at a distance slightly larger than the thickness of brushes 20. Preferably, plate 10 and side walls 16 are molded as a unit from a plastic material soft enough to be scored by a sharp metal edge for a purpose hereinafter disclosed, yet rigid, durable, and inexpensive.

The upper wall of channel 18, when the apparatus is assembled, is defined by a plate member 24 which is stamped from a single piece of resilient sheet metal of a thickness slightly less than that of slots 22. A tab 28 is formed by bending a three-sided cutout, near the center of member 24, in such a way as to be within channel 18 and serve as a brush-biasing spring stop surface. The resulting opening 29 may be conveniently used as an entrance for the brush connecting wire 34. Wire crimp tabs 32, as seen in FIG. 4, project upwardly from the surface of member 24 at one end and serve to hold brush connecting wire 34 and, in one embodiment, drive current wire 36.

In a second embodiment, as seen in FIG. 5, a male terminal tab 38 is provided on plate member 39 for receipt of the female terminal 40 of drive current wire 42. This structure facilitates convenient replacement of drive current wire 42 and utilizes the spade terminal 38 as a conductor of drive current to brush connector wire 34 and brush 20.

The plate member 24 (or 39) is secured in its position within slots 22 by means of arms 26 and burrs 44. When member 24 is in position, arms 26 abut the end 27 of channel sidewalls 16 and act as a stop to prevent further movement toward commutator 12. Since, when the apparatus is assembled, brush-biasing spring 30 is compressed between stop surface 28 and brush 20, a net force will act on member 24 (or 39) in the direction away from commutator 12. To resist this force and thereby insure contact between brushes 20 and commutator 12, a pair of burrs 44 are provided on each side edge of member 24 (or 39). As seen in detail in FIG. 6, burrs 44 are formed by cutting the slot fitting edges of the member and bending the cut portions upwardly and backwardly from the direction of the commutator 12. On insertion of member 24, the burrs resiliently bend to accommodate the sides of the slot 22. When the desired position is reached, backward movement is prevented by the points 46 which dig into the upper wall of the soft plastic slot 22.

When the plate 10 is secured in the motor housing in its desired position surrounding commutator 12, the apparatus is prepared for use by inserting a brush 20, having its connecting wire 34 already attached, in each channel 18. Connecting wire 34 is then threaded through biasing spring 30 and exited through the space between the coils near the end opposite the position of brush 20. The plate member 24 (or 39) is inserted into slots 22 and pushed therethrough until the free end of pigtail wire 34 may be threaded through opening 29. Further insertion compresses spring 30 between spring stop surface 28 and brush 20. When insertion is complete, arms 26 abut side wall ends 27; brush connection wire 34 is then crimped into crimp tabs 32 along with drive current wire 36 in the embodiment of FIG. 1. In the embodiment of FIG. 5, only the connecting wire 34 is crimped. The drive current wire 42 is connected by mating male terminal tab 38 with female terminal 40. In either embodiment, some slack should be left in connecting wire 34 to allow for wearing down of brush 20 during prolonged operation of the motor, thereby lengthening the distance between crimp tabs 32 and the wire connection to brush 20. An additional electrical path is provided where brush 20 touches plate member 24.

Other embodiments are within the following claims.

What is claimed is:

1. A brush holder for use with an electrical motor having a commutator comprising:

a brush supporting and guiding element for supporting and guiding a motor brush for radial movement relative to said commutator;

said element comprising a base and wall means together defining an elongated brush supporting and guiding channel extending radially with respect to said commutator with opposed slots in opposite walls thereof;

a brush stop surface disposed within said channel adjacent its end remote from said commutator, and;

a metal plate member mounted in said slots and extending therebetween, said plate member defining a wall of said brush guiding channel and having integral wire connection means and retaining means for securing said plate member in said slots.

2. The holder of claim 1, further comprising:

a motor brush mounted in said channel between said metal plate member and opposite wall means defining said channel, in electrical contact with said metal plate member, and;

brush-biasing spring means interposed between said stop surface and the end of said brush remote from said commutator for urging said brush toward said commutator.

3. The holder of claim 2, wherein said brush has a brush connecting wire extending from said brush to said wire connector means.

4. The holder of claim 1 wherein said wire connecting means comprises crimp tabs.

5. A brush holder assembly for use with an electrical motor having a commutator comprising:

an integrally molded insulating plastic plate having brush supporting and guiding sites for supporting and guiding motor brushes for radial movement relative to said commutator, each said site comprising:

a base for attachment to said motor defined by said plate;

a pair of spaced integral upstanding wall means defining an elongated brush supporting and guiding channel extending radially with respect to said commutator, with opposed slots extending radially with respect to said commutator in said pair of wall means of said channel;

a spring stop surface disposed within said channel adjacent its end remote from said commutator for stopping a brush-biasing compression spring, and;

a metal plate member mounted in said slots and extending therebetween, said plate member defining one wall of said brush guiding channel, and having integral wire connection means and retaining means for holding said plate member in said slots.

6. The holder of claim 5, further comprising:

a motor brush mounted in said channel between said metal plate member and opposite wall means defining said channel, in electrical contact with said metal plate member, and;

brush-biasing spring means interposed between said stop surface and the end of said brush remote from said commutator for urging said brush toward said commutator.

7. A brush holder as claimed in claim 5, wherein said metal plate member has an integral male terminal tab.

8. A brush holder for use with an electrical motor having a commutator comprising:

an integrally molded insulating plastic brush supporting and guiding structure for supporting and guiding a pair of opposed motor brushes for radial movement relative to said commutator, said structure having a base for attachment to said motor and two pairs of spaced integral upstanding wall means each defining, together with said base, an elongated brush supporting and guiding channel extending radially with respect to said commutator, with opposed slots extending radially with respect to said commutator in each said pair of wall means of said channel;

a metal plate member mounted in said slots and extending therebetween, said plate member defining one wall of said brush guiding channel, said metal plate member having integral wire crimp-tabs; a biasing spring stop portion extending into said channel adjacent its end remote from said commutator, and resilient burrs on its longitudinal slot-fitting edges extending out of the plane of said plate member outwardly from said channel and backwardly from said commutator;

a motor brush mounted in said channel between said metal plate member and opposite wall means defining said channel, in electrical contact with said metal plate member, and;

brush-biasing spring means interposed between said stop portion and the end of said brush remote from said commutator for urging said brush toward said commutator.

9. A brush holder as claimed in claim 8 wherein said spring means is a coil spring and said brushes have a brush connecting wire extending through said coil spring.

10. A brush holder for use with an electrical motor having a commutator comprising:

a brush supporting and guiding element for supporting and guiding a motor brush for radial movement relative to said commutator;

said element comprising a base and wall means together defining an elongated brush supporting and guiding channel extending radially with respect to said commutator with opposed slots in opposite walls thereof;

a metal plate member mounted in said slots and extending therebetween, said plate member defining a wall of said brush guiding channel and having integral wire connection means and retaining means for securing said plate member in said slots; and a brush stop surface disposed within said channel adjacent its end remote from said commutator;

said stop surface comprising a flange extending from said plate member into said channel.

11. The holder of claim 10 wherein said retaining means comprises resilient burrs extending out of the plane of said plate member from its longitudinal slot-fitting edges, outwardly from said channel and backwardly from said commutator.

* * * * *